(12) United States Patent
Hsu et al.

(10) Patent No.: US 10,279,415 B2
(45) Date of Patent: May 7, 2019

(54) TWO-STAGE SWITCH-MODE POWER SUPPLY FOR DRAWN-ARC STUD WELDING

(75) Inventors: Christopher Hsu, Avon, OH (US); Larry Church, Jefferson, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 890 days.

(21) Appl. No.: 13/231,269

(22) Filed: Sep. 13, 2011

(65) Prior Publication Data

US 2013/0062327 A1    Mar. 14, 2013

(51) Int. Cl.
- B23K 9/09    (2006.01)
- B23K 9/10    (2006.01)
- B23K 9/20    (2006.01)

(52) U.S. Cl.
CPC ............ B23K 9/1043 (2013.01); B23K 9/20 (2013.01)

(58) Field of Classification Search
CPC ............ B23K 9/20–9/208; B23K 9/1043
USPC .......................... 219/130.1–137 PS
See application file for complete search history.

(56) References Cited

U.S. PATENT DOCUMENTS

| | | | |
|---|---|---|---|
| 3,365,644 A * | 1/1968 | Smallman ............... 320/116 |
| 5,317,123 A * | 5/1994 | Ito ......................... 219/98 |
| 5,565,116 A | 10/1996 | Barton et al. |
| 5,747,773 A | 5/1998 | Griffin et al. |
| 5,767,657 A * | 6/1998 | Oglesbee ............ H02J 7/0031 320/101 |
| 6,023,037 A | 2/2000 | Church et al. |
| 6,111,215 A * | 8/2000 | Lilly .................... 219/130.51 |
| 6,476,354 B1 * | 11/2002 | Jank et al. ............ 219/137 PS |
| 7,049,545 B2 * | 5/2006 | Matus .................. B23K 9/1006 219/130.21 |
| 7,176,401 B2 * | 2/2007 | Sakoda ..................... 219/99 |
| 7,183,517 B2 | 2/2007 | Albrecht et al. |
| 7,858,895 B2 | 12/2010 | Moore |
| 2005/0109748 A1 | 5/2005 | Albrecht et al. |
| 2007/0056934 A1 | 3/2007 | Hsu |
| 2007/0215585 A1 * | 9/2007 | O'Connor ........... B23K 9/1081 219/130.1 |
| 2008/0053967 A1 | 3/2008 | Moore |
| 2008/0087654 A1 | 4/2008 | Fulmer et al. |
| 2010/0170580 A1 | 7/2010 | Hsu et al. |
| 2010/0230389 A1 * | 9/2010 | Hsu et al. ................... 219/74 |

* cited by examiner

Primary Examiner — Sang Y Paik

(57) ABSTRACT

A drawn arc welding device includes a welding tool, and an energy storage device coupled to a power source. A charging circuit is connected to the energy storage device replenishing the storage device. A discharge circuit is connected to the welding tool and energy storage device. The discharge circuit regulates and adjusts a welding current of the welding tool to a specified amount. Also disclosed is a process that includes charging the energy storage device, actuating the welding tool, energizing a pilot arc current, lifting the weld stud off a workpiece to draw the pilot arc, energizing a welding arc wherein the discharge circuit regulates a welding current of the welding tool to a specified amount, and plunging the weld stud into the workpiece and turning off the discharge circuit.

11 Claims, 4 Drawing Sheets

TWO-STAGE SWITCH-MODE POWER SUPPLY FOR DRAWN-ARC STUD WELDING

FIELD OF THE INVENTION

The invention relates to drawn arc welding tools and processes.

BACKGROUND OF THE INVENTION

Generally drawn arc stud welding utilizes stud welding devices that are powered by a three phase 480 volt line power. Such power supplies utilize a three phase industrial power requiring a qualified electrician to connect and disconnect and often requiring crane or forklift operators to relocate them. Additionally, three phase power drops may not be readily available at fabrication shops and repair sites and studs are often welded with inefficient stick welding (SMAW) power sources using available single phase power. Capacitor discharge (CD) stud welding is often powered by domestic single phase supply but CD is restricted to small diameter studs and is not as reliable as drawn-arc stud welding.

There is therefore a need in the art for a drawn arc stud welding power supply that may utilize a single phase domestic line power such as a 115 volt AC in the U.S. or a 230 volt AC in Europe.

There is also a need in the art for a drawn arc stud welder that reduces the input voltage necessary for a drawn arc welding operation. A lower voltage power supply will allow for use in locations where a 3 phase 480 volt or 400 volt industrial power supply is not present. Additionally, there is a need in the art for a drawn arc welding process and power supply providing high quality welds that are easy to inspect and deliver a predictable weld.

Prior art patents associated with welding operations and specifically drawn arc stud welding operations and devices fed by single phase domestic power are deficient for providing a power source in which a current may be adjustable and regulated. For example, prior art U.S. Pat. No. 7,858,895 discloses a portable drawn arc stud welder with a battery as an energy device. The patent discloses using a battery charger to charge a battery and then uses three MOSFET circuits in parallel to discharge the battery with timer controls to provide a fixed time pulse from 0.1 to 1.1 seconds in duration with current given by output circuit drop (cables, etc.) and battery impedance. However, the prior art patent includes disadvantages in that the welding current may not be adjusted and that the welding current is nonregulated.

Additionally, U.S. Pat. No. 7,183,517 discloses a portable welding-type apparatus that has an energy storage device. The '517 patent discloses a welding power source that includes an energy storage device such as a battery which supplies power to a boost converter linked with a buck converter whose output is then utilized for SMAW, GMAW, GTAW, plasma cutting, and heating. In contrast with a drawn arc stud welding process, the '517 prior art patent requires a boost converter and is configured for other types of high duty cycle welding processes where the welding power is drawn from the energy storage device continuously during welding, typically in minutes per weld. In contrast a drawn arc stud welding has a very low duty cycle, typically in a fraction of a second per weld. Additionally, a drawn arc stud welding process needs a temporary energy storage to accumulate enough energy for a stud welding operation as a typical household line power with a 20 amp service is insufficient in wattage for a typical drawn arc stud welding operation directly without energy storage ahead of welding. The topology disclosed in the '517 prior art patent is intended to utilize current from a low voltage battery continuously while welding thus requiring the boost converter to boost the voltage from the low battery voltage to a higher voltage suitable for use by the various arc welding and cutting processes.

There is therefore a need in the art for an improved drawn arc welding power supply and process that overcomes the deficiencies of the prior art.

SUMMARY OF THE INVENTION

In one aspect, there is disclosed a drawn arc welding device that includes a welding tool receiving a welding stud. An energy storage device is coupled to a power source. The energy storage device stores energy at a voltage above a welding voltage. A charging circuit is connected to the energy storage device replenishing the storage device. A discharge circuit is connected to the welding tool and energy storage device. The discharge circuit regulates and adjusts a welding current of the welding tool to a specified amount.

In another aspect, there is disclosed a drawn arc welding process that includes the steps of: providing a welding tool having a weld stud, providing an energy storage device coupled to a power source, providing a charging circuit connected to the energy storage device, providing a discharge circuit connected to the welding tool and energy storage device, charging the energy storage device, actuating the welding tool, energizing a pilot arc current, lifting the weld stud off a workpiece and draws the pilot arc, energizing a welding arc wherein the discharge circuit regulates a welding current of the welding tool to a specified amount, and plunging the weld stud into the workpiece and turning off the discharge circuit.

DETAILED DESCRIPTION OF THE PREFERRED EMBODIMENTS

Figure 1:
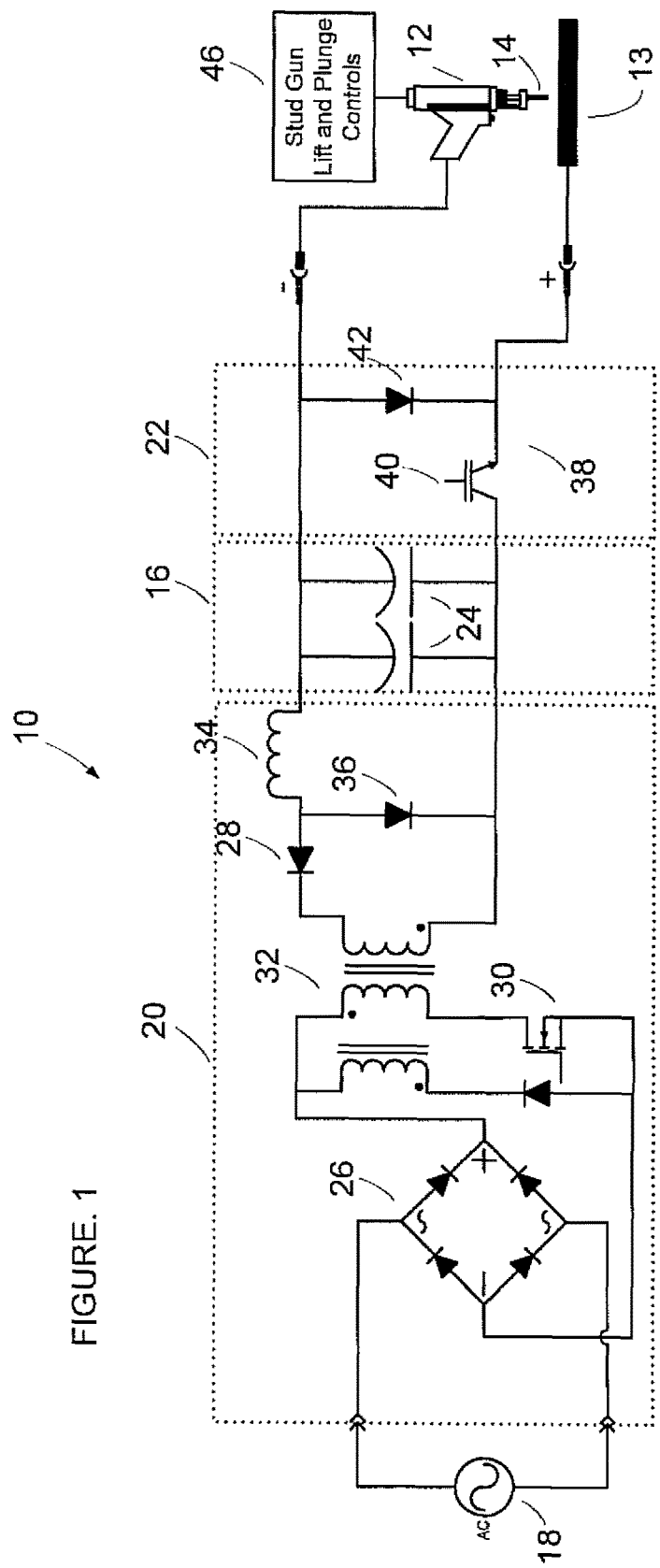
FIG. 1 is a schematic diagram of one embodiment of a drawn arc welding device.

Referring to FIG. 1, there is shown a schematic representation of a drawn arc welding device 10 according to one embodiment. The drawn arc welding device 10 includes a welding tool 12 that receives a welding stud 14. The welding device 10 is coupled to a single phase AC input power supply 18. In one aspect, the AC supply 18 is line power or mains from the electricity grid. In another aspect, the AC supply 18 is portable generator. The energy storage device 16 stores energy at a voltage above a welding voltage utilized by the drawn arc welding device 10. A charging circuit 20 is connected to the energy storage device 16 and replenishes the storage device 16. A discharge circuit 22 is connected to the welding tool 12 and energy storage device 16. The discharge circuit 22 regulates and adjusts a welding current of the welding tool 12 to a specified amount and time. In the depicted embodiment of FIG. 1, the energy storage device 16 includes a bank of capacitors 24 that are connected in parallel. The input power 18 includes a household power of 115 volts at 60 hertz in North America and 230 volts at 50 hertz in Europe. The charging circuit 20 in the depicted embodiment includes a full wave bridge rectifier 26 that is output to a forward converter 28. A transistor switch 30 may be utilized to turn on and off at a designated frequency such as at 30 kilohertz. A power transformer 32 may include a turns ratio of 1:2.5 to produce a specified voltage such as 400 volts at the secondary winding. A choke 34 limits the current flow to a high voltage fast rectifier 36. The rectifier 36 is coupled to the energy storage device 16 and stores it at a typical amperage of from 2 to 4 amps. Various drive and control circuits may be utilized in the power circuit to reduce harmonics and noise emission. The voltage in the energy storage device 16 may be monitored such that the transistor switch 30 is turned off when a desired voltage in the energy storage device 16 is reached. While the depicted embodiment details a single ended forward converter 28, various other DC to DC converters may be utilized such as a flyback or SEPIC converter or a converter as shown in U.S. Patent Application Publication 2010/0170880 which is herein incorporated by reference.

In one aspect, the energy storage device 16 retains energy for one stud welding operation. As detailed previously, the depicted embodiment utilizes a capacitor 24 which may be a bank of capacitors 24. In one aspect, the capacitors 24 may have a 200 volt voltage rating and have 27,000 microfarads in capacitance. For a typical drawn arc welding operation for a short cycle welding 3/16 inch insulation pins is 300 amps constant current pulse of 85 milliseconds. With a 40 volt output voltage the required energy is approximately 1020 joules. This output characteristic may be accomplished utilizing two capacitors 24 having a total of 54,000 microfarads in capacitance with 10.9 coulombs of 1080 joule initial stored energy at 200 volts prior to welding. During welding, the buck converter 38 may consume 1040 joules dispensed to the welding arc in form of a square wave pulse and in the process of discharging the capacitor bank 24 to 40 volts the capacitor bank 24 retains 43 joules after welding.

A typical weld setting for welding a 5/16 inch diameter stud with a ferrule is 540 amps at 0.25 seconds. Again assuming a 40 volt output voltage, the energy required is 5 kilojoules. This output may be accomplished by utilizing ten capacitors 24 having a 200 volt rating and 27,000 microfarads each with 54 coulombs of full charge and 5½ kilojoules of initial stored energy. During a drawn arc welding process, the buck converter 38 consumes 5.3 kilojoules from the capacitor bank which retains 216 joules at 40 volts. Alternatively, three higher voltage capacitors such as a 370 volt 27,000 microfarad each may also be utilized to accumulate 5.5 kilojoules of initial energy prior to a welding operation.

Again referring to FIG. 1, the drawn arc welding device 10 includes a discharge circuit 22 connected to the welding tool 12 and energy storage device 16. In the depicted embodiment, the discharge circuit 22 includes the buck converter 38. A transistor 40 such as an IGBT module rated at 650 amps switching at 5 kilohertz to 30 kilohertz may be utilized. When the transistor switch 40 is on, the current from the energy storage device 16 is fed to the positive output and provides current to the workpiece 13. The stud welding tool 12 is receiving a stud 14 which through an arc returns to the negative output. A freewheeling rectifier 42 conducts and supplies welding current when the transistor switch 40 is turned off. The freewheeling rectifier 42 may be a power diode rated at, for example, 650 amps. The output of the buck converter 38 can be a current pulse of from 60 to 80 volts and having a current of from 300 to 800 amps with various time durations such as from 20 milliseconds to 350 milliseconds in pulse time. In one aspect, a control circuit may be coupled with the discharge circuit 22 that measures the output of the current flowing through the stud welding tool 12 and the arc between the stud welding tool 12 and workpiece 13 and controls through pulse width modulation duty cycle to regulate the output current for a stud welding operation. In one aspect, a control circuit may command a pulse waveform output of the buck converter 38, for example, a peak current of 600 A and background current of 300 A, and peak pulse width of 7 ms and background pulse width of 25 ms.

In one aspect, the circuitry disclosed in the embodiment of FIG. 1 includes a configuration of a straight polarity welding although it should be realized that the stud welding tool 12 and workpiece 13 may be reversed for a reverse polarity that may be utilized for welding aluminum or galvanized steel.

As detailed in FIG. 1, the welding tool 12 may include lift and plunge controls 46. The lift and plunge controls 46 may utilize a drive circuit to control a solenoid for lift using a spring pressure for plunge or may utilize a motor drive to control a motor.

Figure 2:
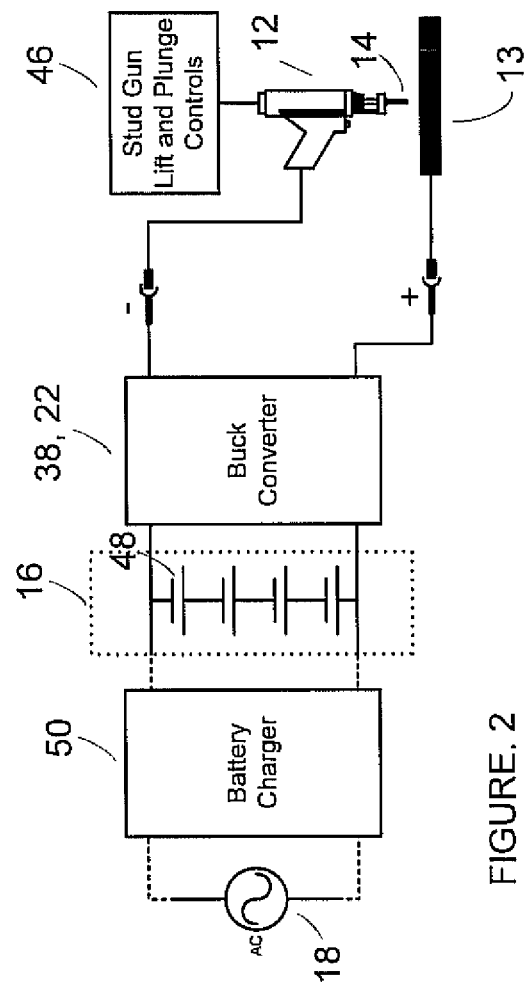
FIG. 2 is a schematic diagram of an alternative embodiment of a drawn arc welding device.

Referring to FIG. 2, there is shown an alternative embodiment of a drawn arc welding device 10. In the depicted embodiment of FIG. 2, the drawn arc welding device 10 may be utilized for multiple welds after a single charge as opposed to the capacitors 24 of the first embodiment. In the alternative embodiment the energy storage device 16 may include at least one battery 48 and in one aspect a plurality of batteries 48 coupled in a bank. It should be realized that various batteries 48 may be utilized such as motorcycle batteries, car batteries, and heavy duty off road equipment or marine batteries. In one aspect, motorcycle batteries may be utilized for short cycle and pin type welds. Twelve volt car batteries may be utilized for studs ranging in size up to ½ inch while heavy duty or marine batteries may be used for 5/8" and larger diameter studs. For example, six 12 volt car batteries connected in series may have a supply of 72 volts to the buck converter. Including a switch loss of 2 volts, the batteries provide 70 volts output voltage for welding such that a full charge of a battery may be utilized to weld up to 400 CPL studs of ½ inch stud diameter. As presented above with respect to the embodiment of FIG. 1, the AC power supply 18 is preferably a single phase household line power of either 115 volts at 60 hertz or 230 volts at 50 hertz that is connected to a battery charger 50. In another aspect, the AC supply 18 is portable generator providing household power. The battery charger 50 in turn is coupled to the at least one battery or bank of batteries 48 which is linked to the buck converter 38 of the discharge circuit 22. As previously described above, the discharge circuit or buck converter 38 regulates and adjusts a current of the welding tool 12 to a specified amount.

Figure 3:
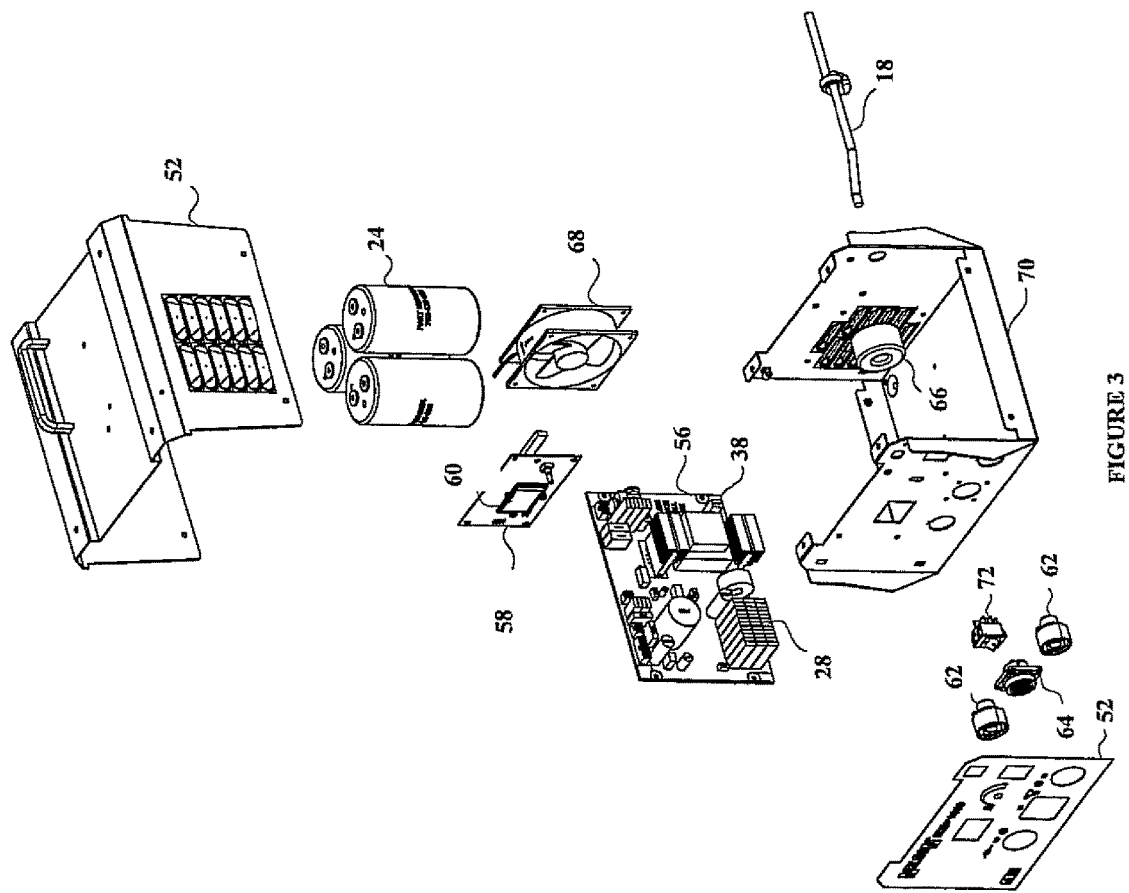
FIG. 3 is an exploded perspective view of a drawn arc welding device.

Referring to FIG. 3, there is shown one embodiment of a power supply and control that is connected to the welding tool 12. In one aspect, the depicted embodiment includes a cover 52 and chassis 70 that house energy storage capacitors depicted at 24. Printed circuit boards 56 include power electronics for the forward converter charge circuit 28 and the discharge or buck converter circuit 38. A PC board 58 may be utilized for control circuitry for a gun solenoid or motor controls as well as to turn off and on the charge circuit 28 as well as monitor and shut off charging. Additionally, the PC board 58 may include a closed loop current regulation of the buck converter 38 and user interface 60 that has a display allowing changes and adjustments in parameters of the welding operation such as the current and time of the weld. The output of the buck converter 38 is provided at two terminals 62 with an additional connector 64 for control of the stud welding tool 12. Additionally, a fan and transformer 66, 68 may be utilized to provide auxiliary power to the PC boards. Power line cord 18 may be connected to a household power drawing a typical household amperage and having 115 volts or 230 volts, as disclosed above. An on/off switch 72 may be utilized to turn the power supply on and off.

Figure 4:
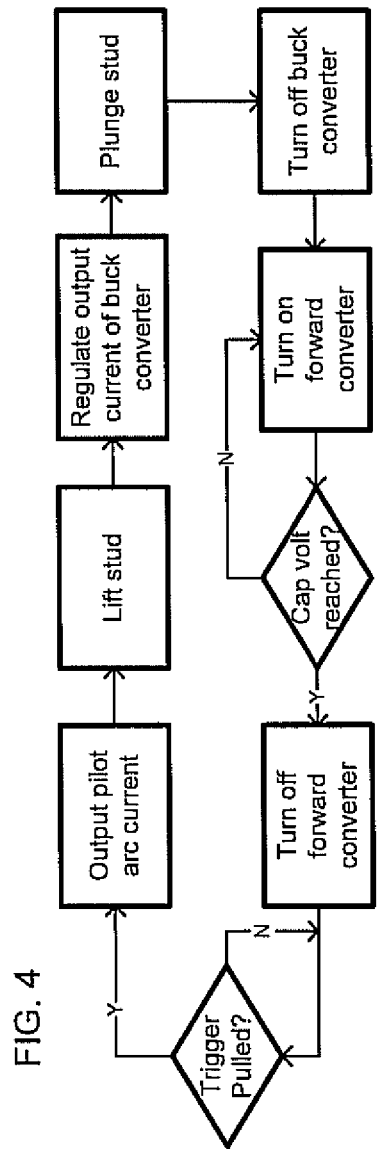
FIG. 4 is a flowchart of a process for drawn arc stud welding.

In another aspect, there is disclosed a process for stud welding or drawn arc welding that includes the steps of providing a welding tool 12 having a welding stud 14, providing an energy storage device 16 coupled to an input power source 18, providing a charging circuit 20 connected to the energy storage device 16, providing a discharge circuit 22 connected to the welding tool 12 and energy storage device 16, charging the energy storage device 16, actuating the welding tool 12, energizing a pilot arc current through the short circuit between a stud and a workpiece 13, lifting the weld stud 12 off a workpiece 13 drawing the pilot arc, energizing a welding arc wherein the discharge circuit 22 regulates and adjusts a welding current of the welding tool 12 to a specified amount, and plunging the weld stud 14 into the workpiece 13 forming a weld and turning off the discharge circuit 22. Referring to FIG. 4, there is shown a flow chart of the process. Following an actuation of the welding tool 12, the control circuitry 58 commands the output of a pilot arc current that is lower than a welding current. The control circuit 58 then commands the lift of a stud 14 to a solenoid or motor in the welding device 12. After the stud 14 is lifted, a closed loop feedback control of a buck converter 38 current output is performed by sending appropriate pulse width modulation for a specified time duration. Next the control circuit 58 instructs the welding tool 12 to plunge a stud 14 and turn off the buck converter 38. Next the energy storage device 16 is replenished until a prescribed energy level is reached awaiting the next actuation of the welding tool 12. In one aspect, the control circuitry 58 of the welding device 10 may be accomplished utilizing various circuitry preferably including microprocessor. The operating sequence may include the following steps. The welding device 10 includes a chuck that holds the stud 14 and pushes the stud 14 against a workpiece 13 creating a short circuit between the stud 14 and workpiece 13. Before a welding operation is performed the charge circuit 20 charges the energy storage device 16. Following actuation of the welding tool 12, the buck converter 38 of the discharge circuit 22 delivers a small pilot arc typically at a current of from 25 amps to the short circuit. After about 5 milliseconds the welding tool 12 lifts the stud 14 drawing an arc at 25 amps. Due to the sudden load increase from the arc voltage, pulse width modulation pulse width to the transistor 30 is increased. The control circuitry 58 of the welding device will then further increase the pulse width to output a desired welding current such as at 300 amps for a fixed duration for such time as 85 milliseconds. The control circuit 58 will then plunge the stud 14 towards the workpiece 13 as the arc is terminated. Pulses to the transistor 30 will stop thus turning off the buck converter 38. At this time the forward converter 28 is turned on to recharge the capacitor bank or capacitor 24 in the first embodiment. Alternatively, the pilot arc may be supplied by an auxiliary power supply connected in parallel with the buck converter 38. In one aspect, a power MOSFET or SCR may be connected in series with a current limiting resistor across an IGBT.

As previously stated above, charging of the energy storage device 16 preferably includes charging the energy storage device 16 to a voltage above a welding voltage. Additionally, energy stored in the energy storage device 16 such as in the first embodiment is preferably greater than 1000 joules. Additionally, capacitors 24 associated with the first embodiment may include a capacitance greater than 27,000 microfarads. Further, with respect to the second embodiment, the energy storage device or battery 48 preferably has an output voltage greater than 48 volts.

The invention claimed is:

1. A drawn arc stud welding device comprising:
   a welding tool including a chuck for carrying a welding stud;
   an energy storage device formed from at least one capacitor, the energy storage device configured to store energy sufficient for at least one drawn arc stud weld at a voltage above a welding voltage, wherein an input of said energy storage device is coupled to a charging circuit and an output of said energy storage device is coupled to a discharge circuit;
   said charging circuit connected to the energy storage device and configured to fully charge said energy storage device for a single weld from a single phase household AC power source before each weld;
   a discharge circuit having an input and an output, said input connected to said energy storage device and said output connected to said welding tool, said discharge circuit for regulating the weld current applied to the weld tool, said discharge circuit directing weld current from said energy storage device to the welding stud under the control of a control circuit, wherein said control circuit includes a pulse width modulation circuit that is configured to control said discharge circuit and regulate said welding current to a set specified amount by way of closed loop feedback that is delivered to the welding tool as a function of the level of weld current set by a user, said control circuit is further configured to turn off the discharge circuit after each weld and cause the energy storage device to be recharged for another weld, said discharge circuit including a buck converter coupled to said energy storage device for regulating the weld voltage applied to the weld tool; and
   a user interface for enabling a user to be selectively adjust the weld current to be supplied to said welding stud across a range of weld currents.

2. The drawn arc stud welding device of claim 1 wherein the charging circuit includes a forward converter.

3. The drawn arc stud welding device of claim 1 wherein the set specified amount can be a constant main arc current, or a pulsed current waveform.

4. The drawn arc stud welding device of claim 1 wherein an energy stored in the storage device is greater than 1000 joules.

5. The drawn arc stud welding device of claim 1 wherein the capacitance of the plurality of capacitors is greater than 27,000 microfarads.

6. The drawn arc stud welding device of claim 1 wherein the single phase input AC power source is a nominal 115-volt single phase household power source.

7. A drawn arc process which utilizes a welding tool for carrying a weld stud; said welding tool having a user interface for adjusting the welding current to a set specified amount; an energy storage device; a charging circuit configured to be connected to a single phase household AC power source and charge the energy storage device to a sufficient level for at least one weld before each weld, said energy storage device formed from at least one capacitor; a discharge circuit having an input and an output, said output connected to the welding tool and said input connected to said energy storage device, said discharge circuit for discharging the energy storage device under the control of a control circuit that includes a pulse width modulation circuit that is configured to regulate said discharge current by way of a closed loop and regulate said welding current delivered to the welding tool to a specified amount as a function of the level of weld current set by a user, said discharge circuit including a buck converter coupled to said energy storage device for regulating the weld current applied to the weld tool; the process comprising the steps of:

charging the energy storage device to a level sufficient for at least one weld at a voltage greater than the weld voltage;

regulating the weld current applied to the welding tool;

energizing a pilot arc current once the welding tool is actuated after the trigger is pulled;

drawing a pilot arc as a result of lifting the weld stud off a work piece;

energizing a welding arc wherein the welding current of the welding tool is regulated and adjusted to a specified amount as set by said user interface;

forming a weld and turning off the discharge circuit when the weld stud is plunged into a work piece; and recharging the energy storage device to a level sufficient for at least one weld before each weld.

8. A welding device comprising:

a welding tool for carrying a welding stud;

an energy storage device formed from at least one capacitor capable of storing Joules energy sufficient for at least one drawn arc stud weld;

a charging circuit coupled to a single phase household power source and said energy storage device for charging said energy storage device before each weld;

a discharge circuit having an input and an output, said output connected to said welding tool and said input connected to said energy storage device, the discharge circuit including a control circuit which regulates the weld current and includes a pulse width modulation circuit for closed loop regulation of said welding current to a specified amount in response to a set amount set by said user by way of said user interface, said discharge circuit including a buck converter coupled to said energy storage device for regulating the weld voltage applied to the weld tool; and a user interface for enabling a user to be selectively adjust the weld current within a range of weld currents.

9. A welding device comprising:

a welding tool for carrying a welding stud;

an energy storage device, formed from at least one capacitor and coupled to a single phase input 115-volt AC household power source, the energy storage device configured to store energy sufficient for at least one drawn arc stud weld;

a charging circuit coupled to said single phase 115-volt AC household power source and said energy storage device for charging said energy storage device before each weld, a discharge circuit having an input and an output, said output connected to said welding tool and said input connected to said energy storage device, the discharge circuit including a control circuit for regulating the weld current which includes a pulse width modulation circuit for a closed loop regulation of said welding current to a specified amount in a user-selectable range of 300-800 amps, said discharge circuit including a buck converter coupled to said energy storage device for regulating the weld voltage applied to the weld tool.

10. The welding device recited in claim 9, further including a user interface for enabling a user to be selectively adjust the weld current to a predetermined value.

11. The welding device recited in claim 10, wherein said welding current is in the form of current pulses and said discharge circuit and said user interface is configured to enable the pulse width of said pulses to be adjusted.

* * * * *